Nov. 8, 1966 G. G. ALLENBAUGH, JR 3,284,046
ROTARY VALVES
Original Filed June 28, 1963 2 Sheets-Sheet 1

INVENTOR.
GEORGE G. ALLENBAUGH, Jr.
BY *Watts & Fisher*

Nov. 8, 1966   G. G. ALLENBAUGH, JR   3,284,046
ROTARY VALVES

Original Filed June 28, 1963   2 Sheets-Sheet 2

INVENTOR.
GEORGE G. ALLENBAUGH, Jr.
BY *Watts & Fisher*

United States Patent Office 3,284,046
Patented Nov. 8, 1966

3,284,046
ROTARY VALVES
George G. Allenbaugh, Jr., Rittman, Ohio, assignor to Akron Brass Company
Continuation of application Ser. No. 291,329, June 28, 1963. This application July 1, 1965, Ser. No. 470,337
2 Claims. (Cl. 251—315)

This application is a continuation of application Serial No. 291,329 filed June 28, 1963, and now abandoned, for Rotary Valves.

This invention relates generally to rotary valves for handling fluids, and more specifically to new and improved seal constructions for use in such valves.

In particular, the invention is concerned with the provision of a novel seal for rotary plug or ball valves. The usual construction of valves of this type includes a valve body having inlet and outlet ports. A rotary valve plug, which may be spherical, cylindrical, or the like, is seated in the valve body to control the flow of liquid through the valve. The valve plug is provided with a through passage and is rotatable between a fully open position wherein the passage is aligned with the inlet and outlet ports and a fully closed position wherein the passage is at substantially right angles to the inlet and outlet ports.

Fluid valves of the type described are known to present many problems, particularly in high pressure applications. One of the more troublesome of these problems has been that of effecting a fluid-tight seal in the closed position of the valve, while providing a construction in which the plug can be easily rotated. Various seal structures have been proposed in the past in attempts to overcome the problem, but none of the known arrangements has been completely successful.

In a typical construction, the valve body has been provided with either an integral or inserted valve seat surrounding the inlet and/or the outlet port. In order to form as effective a fluid seal as is possible, the plug was carefully machined and held tightly against the valve seat. Nevertheless, internal leakage around the plug frequently occurred because of the high pressure of the fluid which acts to separate the valve plug from the seat. Further, the high frictional forces resulting from the mounting of the plug tightly against the valve seat made this prior art valve construction difficult to operate because of the torque necessary to rotate the plug. While various methods of lubrication have been resorted to in the past in attempts to reduce the friction between the plug and the seat, these expedients were usually unsatisfactory, since the lubricant was diluted and washed away by the fluids being handled.

Another conventional construction embodied either a Teflon ring or a rubber ring that acted against a metal surface in the closed position of the valve. The use of Teflon as a sealing material which acts on a metal surface has not been satisfactory for the reason that foreign material, such as mineral deposits and other substances in the fluid handled by the valve, will embed itself in the Teflon and gall the mating metal surface when the plug is rotated. This action causes high friction and results in a hard-working valve. Further, galling of the metal surface will eventually destroy the fluid seal between that surface and the Teflon. The use of a rubber sealing member which acts on a metal surface has the disadvantage of a high coefficient of friction and also results in a hard-working valve.

Another problem associated with rotary valves is that mineral deposits customarily build up on the plug adjacent the valve seat when the valve has been in use for a period of time. Thus, when operating the valve, it is necessary to break the valve seat out of the deposits by rotating the plug and forcing the deposits across and against the seat. This action can damage the seat and will frequently score the valve plug so that a tight, effective fluid seal can no longer be obtained.

The foregoing problems are overcome by the present invention which provides a new and improved sealing structure for a rotary valve that is effective to maintain a fluid-tight seal in the closed position of the valve, while permitting the plug to be turned easily. The new sealing structure is further characterized in that it is not susceptible to a build-up of mineral deposits or the like on the seal faces.

In general, the invention contemplates the provision of a seal member carried in the housing around one of the ports and a plug which includes a cooperating seal member. The two members are made of compatible organic materials characterized in that one sealing member provides a resilient seal face and the other sealing member provides a seal face having a low coefficient of friction. According to the preferred construction, the resilient sealing member is made of rubber and the cooperating sealing member is made of Teflon.

The use of a material such as Teflon which coacts with a resilient, rubber-like material to effect a seal in a rotary valve affords important advantages. In particular, the low coefficient of friction of Teflon overcomes the normal hard-working characteristics of rotary valves so that the plug can be easily turned. Further, the Teflon seal face is not susceptible to a build-up of mineral deposits or the like, since such deposits are easily wiped from the seal face when the valve plug is turned. The cooperating rubber-like, resilient seal face assures an excellent fluid seal even though the Teflon face may be scored by trapped mineral deposits, grit or other material forced between the seal faces by operation of the valve.

The invention also contemplates a seal construction in which one sealing member is in the form of a face ring carried by the plug in such a manner that the ring can be replaced when necessary. This construction eliminates the need for frequent costly replacement of the entire plug, as is presently necessary in many conventional valves. While it is recognized that attempts have been made in the past to provide rotary plug valves with replaceable sealing rings, most of these conventional constructions have been such that the rings are subject to damage and to being cocked or displaced because of the high fluid pressures and velocities in the valve housing. The plug and face ring of this invention are secured together in a novel manner which resists high fluid pressures and velocities and yet facilitates ready replacement of the face ring without the need of dismantling the entire valve.

Other advantages and a fuller understanding of the invention will be had by reference to the following detailed description when taken in conjunction with the accompanying drawings.

Figure 1:
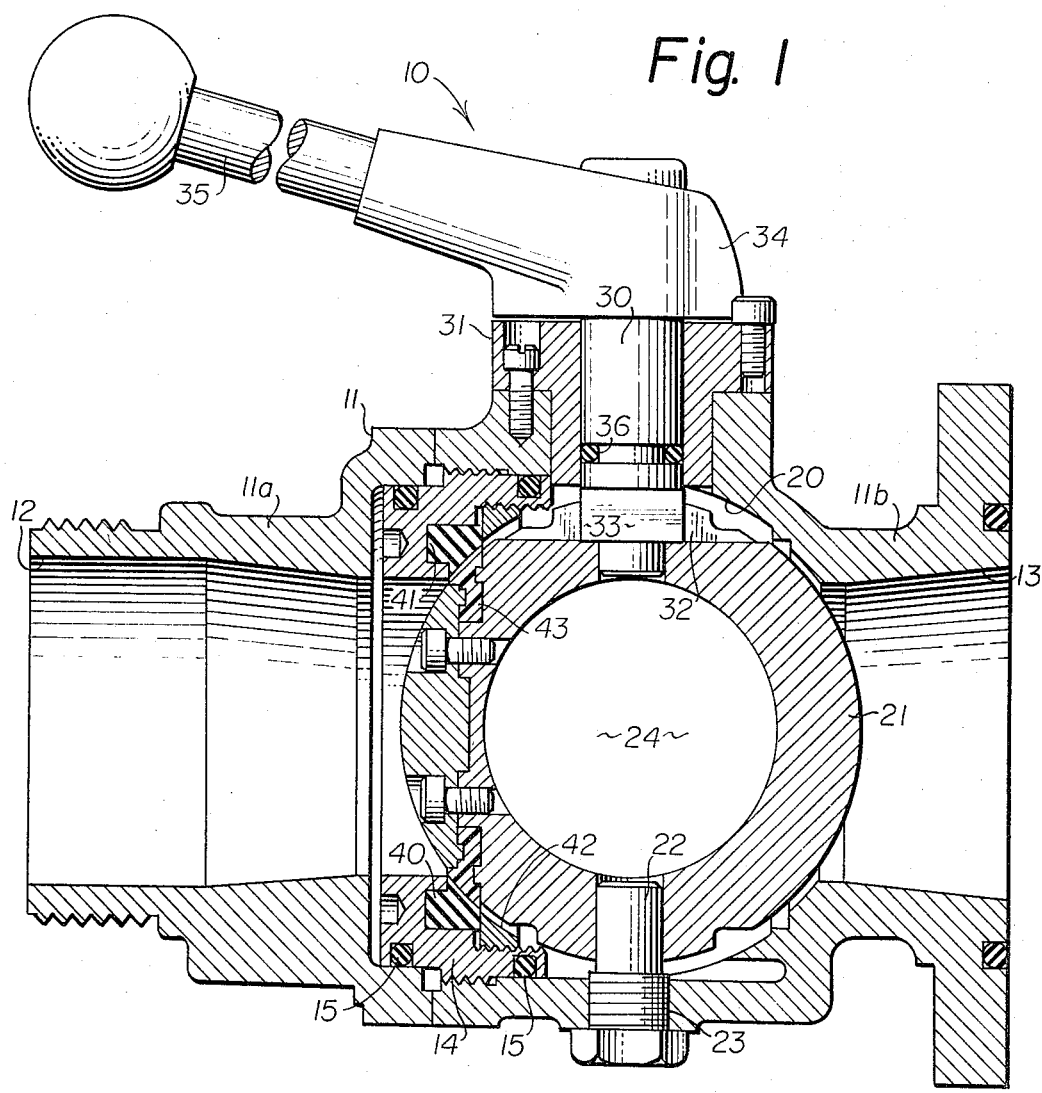
FIGURE 1 is a vertical cross-sectional view of a ball valve embodying the novel seal of this invention.

Referring now to the drawings, and to FIG. 1 in particular, there is shown a ball valve 10 including a valve body 11 which is comprised of two sections 11a and 11b held together by bolts (not shown). The body sections 11a and 11b respectively define an outlet port 12 and an aligned inlet port 13. The valve body 11 also includes a ring 14 which is threadedly engaged within the body section 11b so as to form a continuation of the outlet port 12. Suitable O-rings 15 are carried by the member 14 and are in fluid sealing engagement with the inner walls of the valve body proper.

The valve body 11 defines a fluid chamber 20 in which is mounted a valve plug, such as a valve ball 21, for regulating fluid flow through the valve. As shown, the valve ball 21 is rotatably fitted on a trunnion 22 which has a threaded shank 23 engaged through a wall portion of the valve body. The valve ball also is provided with a through passage 24 and is rotatable on the trunnion 22 between a fully open position wherein the passage 24 is aligned with the inlet and outlet ports and a fully closed position wherein the passage is spaced from the ports.

Rotation of the valve ball 21 is effected by a shaft 30 which extends through a bearing 31 secured on the top of the valve body 11. In the illustrated construction, the valve ball is formed with a slot 32 which cooperates with a flat side portion 33 of the shaft 30 to prevent relative rotation between the shaft and the valve ball. The upper end of the shaft 30 is received within a handle housing 34 to which is secured an actuating valve handle 35. Any suitable driving and locking mechanism (not shown), as for example, that disclosed in copending application Serial No. 162,361, filed December 27, 1961, and entitled Valve, may be provided in the housing 34 in operative engagement with the shaft 30 so that the valve can be operated by turning the handle 35 and subsequently locked against untoward movement. As shown, an O-ring 36 preferably is fitted in a groove around the shaft in sealing engagement with the inner surfaces of the bearing 31.

In the illustrated embodiment of this invention, a seat ring 40 is provided within the chamber 20 around one of the ports, such as the outlet port 12. Preferably, the seat ring 40 is a resilient member made of natural rubber or an elastomer or the like having similar characteristics. As shown, the seat ring 40 is secured in a groove 41 formed in the valve body member 14 and is retained in the groove by a ring 42. The elements 14 and 42 are threadedly engaged and can be disassembled to permit replacement of the seat ring 40 when necessary.

As generally described above, the valve plug or ball 12 includes seal structure having a face which cooperates with the resilient, rubber valve seat 40 and is characterized by a low coefficient of friction to overcome the normal hard-working characteristics of ball valves. The preferred material which obtains the desired characteristics when used in conjunction with the rubber valve seat is a polytetrafluoroethylene resin sold under the trademark "Teflon." It is contemplated by the invention that the seal structure can be provided by using a solid Teflon ball as the element 21 or by coating a metal ball or the like with the synthetic resin. However, in order to permit ready replacement of the seal structure without completely disassembling the valve or replacing the ball 21, the seal structure may be provided in the form of a Teflon face ring 43 which is carried by the ball valve 21 between the ends of the passage 24 and which is engageable with the seat 40 in the closed position of the valve to prevent leakage around the valve ball.

Figure 2:
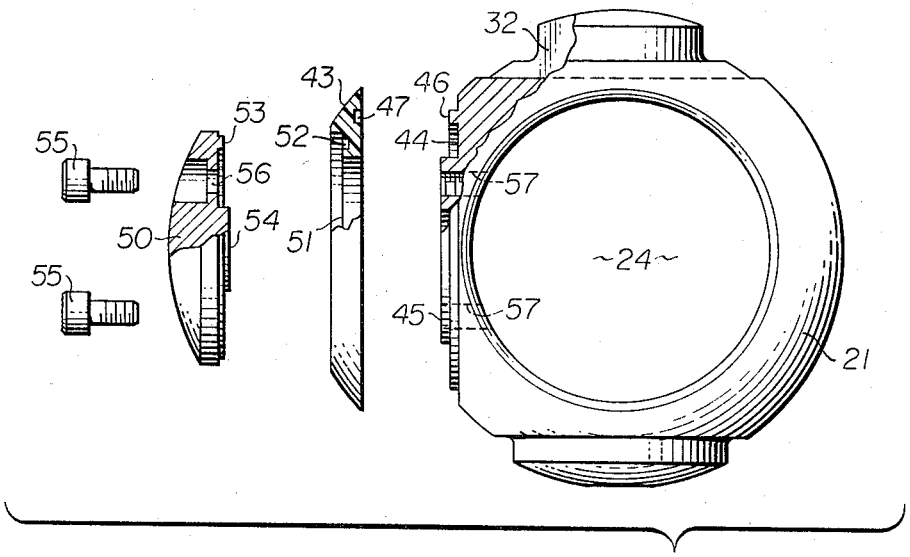
FIGURE 2 is an exploded view, partially in cross-section, of the valve ball and face ring; and, FIGURE 3 is a side elevational view of the assembled valve ball and face ring.
Figure 3:
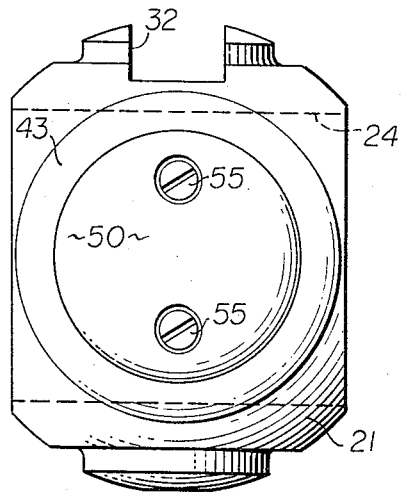

Referring particularly to FIGS. 2 and 3, the valve ball 21 has a seat 44 for the annular face ring 43. In the preferred construction, the seat is formed around an annular boss 45 and includes a spaced lip 46 which surrounds the boss. The face ring 43 is adapted to be engaged around the boss 45 with the lip 46 fitted in a groove 47 formed in the ring.

The ring 43 is clamped on the seat 44 by a detachable wall section 50 of the valve ball 21. As shown, the ring has a recess 51 and a groove 52. The inner face of the wall section 50 is formed with an annular flange 53 adapted to fit in the groove 52 and with a projecting shoulder portion 54 which engages the inner surfaces of the annular boss 45. Suitable screws 55 extend through countersunk holes 56 in the wall section and are threadedly engaged in holes 57 formed in the boss 45.

With the foregoing preferred construction, the face ring insert 43 is securely clamped on the seat 44 and is locked against inadvertent displacement by turning of the valve ball and the high fluid pressures and velocities normally encountered within the valve body. At the same time, the face ring element 43 can be replaced because of wear simply by detaching the wall section 50 instead of replacing the entire valve ball, as is necessary in many conventional valve constructions. Further, it will be apparent that replacement of the face ring, as well as of the valve seat 40, can be accomplished easily by disconnecting the valve body sections 11a and 11b and threading the ring 14 out of the section 11b. Thus, it is not necessary to dismantle the valve completely or entirely to remove the valve from the line in which it may be installed.

Because of the inherent lubricity of the Teflon seal 43, the valve 10 is easy to operate and any mineral deposits or the like which may form on the ring 43 are easily wiped away when the ball 21 is turned. In addition, the resilient characteristics of the novel rubber to Teflon seal of this invention assures that the valve will be leakproof even though the face ring 43 may be scored by gravel or the like. The long life of the new seal structure is even further improved in the illustrated construction wherein the outer surface of the face ring 43 projects beyond the wall portions of the valve ball. Even though mineral deposits may form on the valve ball after the valve has been in use, the peripheral surface of the face ring 43 will extend beyond the deposits so that the valve ball can be rotated without forcing the deposits across the rubber seat 40.

Many modifications and variations of the invention will be apparent to those skilled in the art in view of the foregoing detailed description. Therefore, it is to be understood that, within the scope of the appended claims, the invention can be practiced otherwise than as specifically shown and described.

What is claimed is:
1. A ball valve comprising in combination:
 (a) structure including first and second detachable sections forming a valve body housing;
 (b) said valve body housing having walls defining a fluid chamber;
 (c) said chamber having an inlet port and an outlet port spaced from said inlet port;
 (d) a first, continuous, annular seal element circumscribing one of said ports and forming a valve seat;
 (e) said structure including an annular member carried by the first section to form a continuation of said one port, said valve seat being carried by the annular member so that said seat can be replaced by disconnecting the sections and the annular member;
 (f) a rotatably mounted valve ball assembly;
 (g) said assembly including a ball having a through passage and being rotatable in said fluid chamber between a first position in which said passage establishes fluid communication between said inlet and outlet ports and a second position in which the ends of said passage are spaced from said ports;
 (h) said assembly including a ring of polytetrafluoroethylene defining a second continuous seal;
 (i) said ball including a detachable portion normally holding said ring in position so that the ring can be replaced without completely removing the ball from the chamber;
 (j) said second seal being located to mate with said valve seat at an annular sealing interface circumscribing said one port when said ball is in said second position to prevent fluid flow between said ports;
 (k) said portion defining said second seal and all other surfaces of said ball being spaced from the walls of said fluid chamber in all positions of said ball; and,
 (l) said first seal being formed of rubber,
2. A ball valve comprising in combination:
 (a) structure defining a valve housing having walls defining a fluid chamber;

(b) said structure including:
   (i) at least two detachable housing sections having mating faces,
   (ii) a first fluid port communicating with said chamber,
   (iii) one of said sections having a second fluid port which communicates with said chamber and is aligned with said first port,
   (iv) a ring threadedly engaged in said structure so as to form a continuation of said first port,
   (v) a first O-ring in sealing engagement between said ring and said one section at one side of said mating faces,
   (vi) a second O-ring in sealing engagement between said ring and another of said sections at the other side of said mating faces,
(c) a rubber annular seal carried by said ring within said chamber;
(d) said rubber seal circumscribing said first port and forming a valve seat;
(e) a valve ball having a through passage;
(f) said ball being mounted in said chamber for rotation between a fully open position wherein said passage is aligned with said ports and a fully closed position wherein said passage is spaced from said ports;
(g) said ball including:
   (i) a face ring seat,
   (ii) a detachable wall portion spaced outwardly of said face ring seat;
(h) a face ring formed of polytetrafluoroethylene;
(i) said face ring being engaged between said wall portion and said face ring seat so as to present an annular sealing face projecting beyond the outer surface of said ball;
(j) said face ring being located to mate with said valve seat at an annular sealing inner face circumscribing said first port when said ball is in said fully closed position to prevent fluid flow between said ports;
(k) said face ring, said face ring seat and said wall portion being formed with interfitting portions so as to lock said face ring against displacement by rotation of said ball;
(l) a shaft connected to said ball and extending from said chamber; and,
(m) actuating means connected to said shaft for rotating said shaft and said ball.

References Cited by the Examiner
UNITED STATES PATENTS

| | | | |
|---|---|---|---|
| 2,653,004 | 9/1953 | Schnyder | 251—172 |
| 3,090,396 | 5/1963 | Rudelick | 251—314 X |
| 3,131,906 | 5/1964 | King | 251—315 X |
| 3,195,857 | 7/1965 | Shafer | 251—315 X |

M. CARY NELSON, *Primary Examiner.*

E. FEIN, *Assistant Examiner.*